United States Patent [19]

Nelson et al.

[11] Patent Number: 4,816,177
[45] Date of Patent: Mar. 28, 1989

[54] TREATING AGENT FOR LIQUID MEDIA

[75] Inventors: Bonnie I. Nelson, Mentor; Randolph C. Turk, Euclid, both of Ohio; Lemuel C. Curlin, Allegan, Mich.

[73] Assignee: Eltech Systems Corporation, Boca Raton, Fla.

[21] Appl. No.: 61,931

[22] Filed: Jun. 11, 1987

Related U.S. Application Data

[63] Continuation of Ser. No. 763,041, Aug. 6, 1985, abandoned.

[51] Int. Cl.$^4$ .................................................. C02F 1/68
[52] U.S. Cl. ..................................... 252/181; 106/124; 106/125; 106/137; 106/138; 106/148; 210/749; 210/750; 210/753; 252/175; 252/188.2; 252/188.21; 252/388; 252/389.1; 252/389.2; 530/360; 530/365; 424/465; 424/469; 424/470
[58] Field of Search ...................... 252/175, 181.2, 188, 252/188.21, 388, 389.1, 389.2; 424/22, 36, 37; 210/749, 750, 753; 106/124, 125, 137, 138, 148; 260/117, 119

[56] References Cited

U.S. PATENT DOCUMENTS

| | | | |
|---|---|---|---|
| 3,856,932 | 12/1974 | May | 252/176 |
| 3,860,526 | 1/1975 | Corbett | 252/181 |
| 3,937,668 | 2/1976 | Zolle | 424/36 |
| 3,953,354 | 4/1976 | Faust | 252/187 |
| 4,202,795 | 5/1980 | Burnham et al. | 252/332 |

FOREIGN PATENT DOCUMENTS 0203741 12/1986 European Pat. Off.

OTHER PUBLICATIONS

European Search Report Appln. No. EP 86 10 9888
Partial European Search Report, Appln. No. EP 86 10 9888.

Primary Examiner—Robert A. Wax
Attorney, Agent, or Firm—John J. Freer

[57] ABSTRACT

An agent is disclosed that is useful for treating liquid media, e.g., dechlorinating aqueous media. The agent contains at least one salt from the sulfur oxide family, such as sodium sulfite. In the agent, the salt is in mixture with an organic gel forming binder. The mixed material is especially adapted for preparing self-supporting, discrete particles of solid compacted material, e.g., tableted composition. The composition can provide such compacted material not only of desirable strength and hardness, but also of desirably controlled dissolution rate.

54 Claims, 1 Drawing Sheet

TREATING AGENT FOR LIQUID MEDIA

This is a continuation of application Ser. No. 763,041, filed Aug. 6, 1985, now abandoned.

BACKGROUND OF THE INVENTION

It has been well recognized to treat water with a sulfur material such as sulfur dioxide or soluble sulfite or bisulfite salt. For example in U.S. Pat. No. 4,364,835 the dechlorination of water with such agents is discussed. More particularly there is disclosed the use of a stoichiometric excess of dechlorinating agent. This is to reduce the activity of non-volatile mutagens in the chlorinated water.

There has also been proposed to combine dechlorinating agent with comentitious substance to provide a mixture having a controlled elution of dechlorinating substance. For example it has been proposed in Japanese Patent Public Disclosure No. 55-1873 to combine a dechlorinating substance such as sodium thiosulfate and sodium sulfite with a cement constituent, e.g., gypsum and lime. The combination provides for the gradual dissolution in water of materials including the dechlorinating agent in the mixture.

There has further been proposed to provide an oxygen releasing composition that can be compacted into hard, self-supporting articles. The compaction can be handled under high pressure molding techniques, such as used for tableting. Thus a composition has been disclosed in U.S. Pat. No. 3,260,674 which lends itself to tableting operation and provides a hard tablet of non-chipping characteristic. The tablet retains its shape substantially indefinitely when immersed in water.

It would be desirable to formulate a water treating composition which not only exhibits strength and non-chipping characteristic when pressure molded, but also is free from dusting or other deleterious degradation such as can be encountered in shipping and handling. Such agent, when in molded form, should provide controlled dissolution in aqueous media. It would furthermore be most highly desirable if such composition would lend itself to present day high speed, high pressure molding technique.

SUMMARY OF THE INVENTION

A composition has now been formulated which provides the foregoing described desirable characteristics. More particularly, such composition lends itself to molding operation to prepare discrete, molded articles by high speed, high pressure tableting techniques. Moreover, the formulation yields hard compacted articles that are self-supporting as well as having desirable non-chipping characteristic. Furthermore, the particles are resistant to dusting and flaking. Molded articles, e.g., tablets, exhibit controlled dissolution when in contact with aqueous media.

In brief, the invention in one aspect is directed to a treating agent for controlled dissolution in liquid media, which agent comprises, in blended form, a solid mixture of at least one salt from the sulfur oxide family together with an organic gel forming binder.

Another aspect of the invention is directed to a treating composition in compacted, e.g., tableted, condition and which can be in combination with a holding apparatus having a slotted-opening zone. Yet another aspect of the invention is directed to the method of making such a treating agent of controlled dissolution in liquid media, e.g., a dehalogenation agent or an oxygen scavenging agent, which can be in combination with corrosion inhibitors.

DESCRIPTION OF THE PREFERRED EMBODIMENTS

Figure 1:
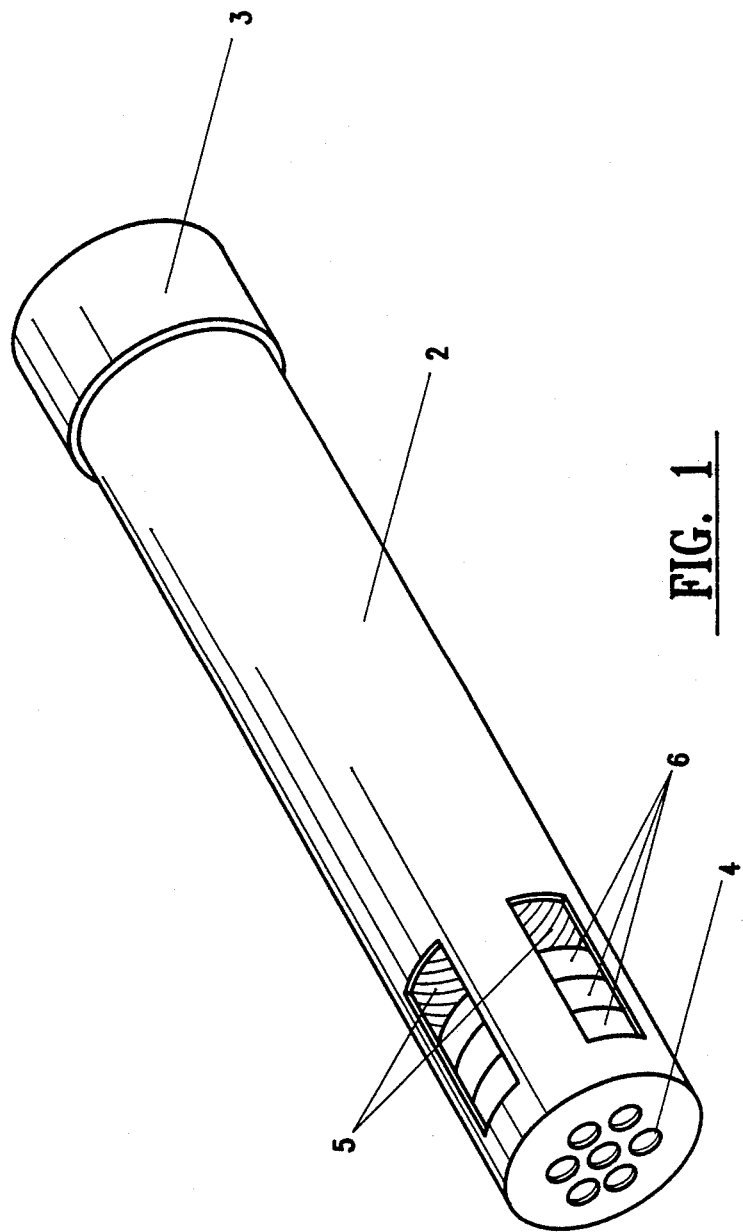
FIG. 1 is a perspective view of a cylinder holder, with slotted-opening end, for containing treating agent in compacted condition.

The treating agent of the present invention is contemplated for use with any liquid media wherein the salt of the agent will be soluble in the media, while the binder of the agent will be at least dispersible therein, and there is a desire to treat such liquid media. Representative treatment would include dehalogenation, e.g., in a liquid media wherein chlorine, bromine or iodine may be present as a contaminant. More specifically, the agent can be useful for treating the chlorine in tap water or a chlorine substance in a plant effluent. It is however to be understood that the agent of the present invention may be otherwise useful, such as an oxygen scavenger to be used, for example, in boiler water. Or the agent may further be employed, especially when in compacted form, for the slow release of substances to liquid media. In a combination role, the agent could scavenge oxygen in boiler water while slowly releasing corrosion inhibitor to such water.

Although treatment for many types of liquid media is contemplated, including plant effluents, the liquid media treated will most always be an aqueous medium. Representative media include brine, and the brine can be treated before ion exchange treatment, as well as such representative media as drilling muds, cooling water blow down, such as for dechlorination or debromination or both, waste water, tap water and process water.

It is known that salts of the sulfur oxide family have the ability to react in liquid media. One example of this is the reduction of chlorine in aqueous media. It has thus been recognized that the salts from the sulfur oxide family which may be useful for dehalogenation agents include sulfates, such as iron sulfate, as well as thiosulfates, e.g., sodium thiosulfate. Other sulfur-containing salts from this family which may be useful as dehalogenation agents or as oxygen scavenging agents are the sulfite salts. For convenience, all of the foregoing are collectively referred to herein as salts "of the sulfur oxide family". Although sulfur dioxide itself can often be used, such as for dechlorination, this gaseous substance is not contemplated for utilization in the present invention. By use of the term "sulfite salts" herein it is meant to include the sulfite, bisulfite, metabisulfite, metasulfite and pyrosulfite salts as well as mixtures thereof. Advantageously for economy and efficiency, such as in dechlorination or oxygen scavenging, the salt used herein is a sulfite salt. It is most economical to use an alkali metal sulfite or a mixture of alkali metal sulfites, e.g., the potassium and sodium alkali metal sulfites. Preferably for best economy sodium sulfate is employed.

For preparation of the treating agent, although it is contemplated to use salts in other forms in such preparation, including a super saturated solution which would be followed by evaporation of a solution medium such as alcohol or water, the salts are virtually always used as free-flowing particulate substances, e.g., in powder or flake form. Although such particulates should advantageously be dry to the touch for best blending of the agent, it is understood that they may contain some moisture, such as water of hydration or hygroscopic moisture or other moisture content. When particulate salts are used, so long as they are free-flowing they can be readily blended in the formulation of the treating agent. It is advantageous for an agent of enhanced physical characteristics that the free-flowing particulate salt have an average particle size within the range of from about 75 microns to about 250 microns. It is also most desirable that such particulate salt have particles more finely divided than about 420 microns (40 mesh) and for best blending be essentially free of fines and dust, e.g., be essentially free of particles having size below about 45 microns (about 325 mesh). Preferably, for enchanced product characteristics such as strength of molded articles, the salt has a particle size distribution such that about 30-50 weight percent of particles are more finely-divided than about 150 microns and about 10-30 weight percent are more finely-divided than about 75 microns. Mesh as used herein is U.S. Sieve Series.

The salt is then blended with an organic gel-forming binder. A material found to be most serviceable for the binder is protein, such as animal protein or vegetable protein, or both. For economy, animal protein is generally selected, for example, gelatin of a milk protein. It has been found that for preparing a product having excellent controlled rate of dissolution, a milk protein binder can be most useful, e.g., the lactalbumin and casein proteins. Hence, a colloidal aggregate composed of several proteins is acceptable, and thus the protein-containing gel-forming binder which is used can contain other substances, e.g., fat, moisture, sugars and minerals such as potassium, calcium, magnesium, sodium, aluminum and iron. It is preferred for best product characteristics that the animal protein be a casein. Thus, suitable binders include paracasein, casein fractions, acid casein and rennet casein. the casein may be frequently available as alkali metal or alkaline earth metal caseinates containing, for example, greater than 50 weight percent protein, and more typically having from about 65 to about 96 weight percent protein. It is most typical to employ a sodium caseinate or calcium caseinate containing 65-94 weight percent protein with calcium caseinate of greater than 90 weight percent protein, exclusive of moisture in the caseinate, being preferred.

The gel-forming binder, although it is contemplated to use same in differing forms, such as in gel form, is most always selected as a free-flowing particulate substance. Such particulates are advantageously dry to the touch to provide for best ease of blending with particulate salt. It is however to be understood that such binder may have a moisture content which is often as great as 4 to 7 weight percent, or even more, basis total weight of the protein.

The protein-containing binders are typically powders of fine granulation. When used as powders, it is acceptable if the binder has particle size of below about 150 microns and advantageously for best blending with the salt, the animal protein should have an average particle size within the range of from about 75 microns to about 250 microns. Usually the presence of dusty fines in selection of a suitable powder is avoided and a material of average particle size of from about 100 microns to about 150 microns is preferred for best ease of blending with the salt.

On a total weight basis of the salt and the gel-forming binder, but excluding added water, as the term is more particularly defined hereinbelow, there is present from about 2 to about 20 weight percent of the binder. Less than about 2 weight percent of binder can be insufficient for providing molded articles having best freedom from dusting and chipping. On the other hand, greater than about 20 weight percent of the binder can lead to molded articles, such as tablets, which may lack strength and have undesirably retarded dissolve rate. For enhanced reactivity plus best physical characteristics, it is advantageous that the blend contain from about 3 to about 15 weight percent of the binder, and from about 4 to about 10 weight percent is preferred.

It will thus be appreciated that the treating agent will readily provide greater than about 50 weight percent of the salt, even when present with the more substantial amounts of binder and even when including significant amounts of additional ingredients, as will be discussed more fully hereinbelow. More typically, compressed solid combinations, e.g., treatment tablets, may contain as much as from 80 to 95 weight percent or more of active salt ingredient, thereby leading to enhanced economy of treatment for liquid media.

When blending the salt and binder, and where free-flowing particulates are employed, it has been found desirable to add some water to the binder or the blend, or to both, especially where molded articles are to be prepared. This deliberately added water is generally referred to herein as the "added water" or "additional water" or "added moisture". As has been mentioned hereinabove, the salt and the binder may already contain moisture. Such ingredients, even as free-flowing particulates that are dry to the touch, may nevertheless contain water of hydration or hygroscopic moisture of the like. The added water, as the term is used herein, is water in addition to the water that it is understood might already be contained in the substances. When proportions are presented wherein it is meant to exclude all moisture, i.e., to exclude water of hydration and exclude added water and the like, the expressions "exclusive of moisture" or "dry basis" will generally be used. Proportions presented not on a "dry basis", can include water of hydration and the like.

This added water will usually be present during the blending of the salt and the binder in an amount from about 2 weight parts to about 20 weight parts, basis 100 weight parts of the mixture and depending upon the mode of mixing selected, as discussed more particularly hereinbelow. Preferably, for best blending there is added from about 3 to about 15 weight parts of added water, with the particular amount again being dependent upon the special processing steps employed.

In addition to the salt, binder, and any added water, the blend may also contain other ingredients such as fillers, dyes, fragances and lubricants. The use of lubricants is preferred for the most efficient preparation of the treating agent in molded forms, such as tablets, where commercial operations will be employed. When used, lubricant will virtually always be present in an amount of less than 5 weight percent of the agent, basis total agent weight, to avoid preparing molded articles of insufficient strength for normal shipping and handling. The agent will most usually contain less than about 2 weight percent of lubricant, but at least about 0.1 weight percent, basis total treating agent weight, when lubricant is present. Use of less than about 0.1 weight percent will be insufficient for providing desirable lubrication property to the agent. It is preferred for economy plus efficient lubrication that the agent contain from about 0.1 to about 1 weight percent of lubricant.

It is contemplated that a wide variety of lubricants will be useful and will include soaps as well as oil-based materials. Representation soaps can be exemplified by fatty acid materials in combination with a metal constituent which can include the alkali and alkaline earth metals. A suitable soap lubricant can thus be calcium stearate, for example. The oil-based lubricants may be derived from petroleum, or animal fats and oils, as well as oil sources. An exemplary lubricant can thus be a hydrogenated vegetable oil. Serviceable lubricants additionally include mixtures, such as a blend of a soap plus an oil-based material. In the mixtures, individual ingredients may be present in equal, to essentially equal, amount, e.g., from about 0.1 to 0.3 weight percent, basis total agent weights, of both a fatty acid soap and an oil-based lubricant. However, other proportions are also highly suitable.

Further ingredients in the treating agent other than the salt, binder, and any added water, and which can be present alone or in mixture, including being in mixture with one or more of those additional materials mentioned hereinbefore, include additives that can be useful for a specific application of the blend, e.g., a corrosion inhibiting additive or sludge removal additive, or additives useful for imparting causticity to the medium, and including additives such as soda ash, phosphate-containing substances including the alkali metal phosphates, tannins, lignins, their mixtures and the like. Also, additional ingredients can be selected on the basis of further processing of the blend, e.g., the use of internal or external lubricants as additives to the blend or in preparing the blend, where compaction into molded articles is contemplated. The total of these additional ingredients will usually comprise less than about 50 weight percent of the blend, and more typically will be present in an amount less than about 30–40 weight percent of the blend. Most often these additional ingredients will be present in an amount of from about 5 to about 30 weight percent of the blend, although lesser quantities may be suitable, e.g., only about 1–2 weight percent or less.

The actual blending operation for the ingredients can be handled most usually in any manner employed for bringing together free-flowing particulates. In the alternative, such as where a super saturated salt solution is used with a gel form of the binder, other methodology for bringing such materials together will be used. But for the dry free-flowing particulates, the general use of blending equipment including a twin-shell mixer or ribbon blender is contemplated. Where moisture is to be added, such can generally be accomplished by spraying water onto the ingredients as they are blending, or may be added to ingredients individually and then such moistened materials added to the blending operation.

In one specific method, the salt and binder can be premixed as dry, free-flowing particulates in any manner suitable for comingling same, while water is sprayed on the mixture. The water may be sprayed during or following the mixing, or at both times. It is to be understood that the spraying of water is to include the use of a fine spray, e.g., a mist, for adding moisture to the mixture. Usually from about 7 to about 20 weight percent, basis weight of the mix, of added moisture will be sufficient. The resulting moistened mixture can then be processed through a screen, i.e., granulated. Suitable screens are such having a size providing particles through 5 mesh, but often the screen mesh will provide large particles within the range of from about 10 to about 20 mesh. Following this wet granulation process, the material is dried, which can be forced drying but is most always simply air drying. The air drying will generally remove at least about 50 weight percent of the added moisture and will provide a granular material having a moisture content, from the added water, of less than about 10 weight percent and most typically of from about 4 to 8 weight percent. The dried granules can then be granulated again, e.g., providing particles through 10 mesh, and most often to have size more finely divided than about 20 mesh, or even finer, such as through 40 mesh.

In an alternative mode for blending the salt and the binder, such can be premixed, and water in an amount from about 4 to 10 weight percent, and more typically from about 4 to about 8 weight percent, basis weight of the mix, can be added. The resulting moistened mixture may then be roller compacted and granulated. The granulation will typically provide particles having size more finely-divided than about 10 mesh, e.g., within the range from about 20 mesh to about 40 mesh, although particles as finely-divided as 100 mesh or more can be prepared. The resulting particles are then ready for further compaction.

The blended materials may be compacted into discrete articles, e.g., molded into tablets. In such compaction operation, well blended material can lend itself to fast operation in high pressure molding techniques. Pressure in compaction can be on the order of from about 5 KPSI to about 20 KPSI with a pressure within the range of from about 8–15 KPSI being most typical. Such operations will typically prepare tablets having a density of on the order of about 1.5 to 2.5 grams per cubic centimeter. The tablets will exhibit desirable strength and hardness, e.g., freedom from chipping as well as dusting.

After compaction operation, the resulting discrete particles may lose moisture. This might be accomplished by simply exposing the particles to the air, i.e., simple air drying at room temperature. However, it is contemplated that forced drying at an elevated temperature may be useful, e.g., a temperature as great as 50° to 60° C. or more.

Compacted particulates, typically in tablet form, can be especially useful for controlled dissolution in liquid media when present in apparatus such as shown in FIG. 1. Referring more particularly to the Figure, a long tube 2 is topped at one end by a cap 3. At the opposite end of the tube 2 from the cap 3 is a perforate plate 4. Adjacent the end of tube 2 near the perforate plate 4 are slotted openings 5 in the tube 2. These slotted openings 5 expose tablets 6.

The tablets 6 can be inserted in the tube 2 by removal of the cap 3 and simply placing the tablets 6 therein. The first tablets 6 entering the tube 2 will rest upon the perforate plate 4, and subsequent tablets 6 will stack one upon the other, there then being several tablets 6 exposed by the slotted openings 5. Upon exposure of the slotted openings 5 to a liquid medium, e.g., a flowing aqueous medium, the medium flowing by the slotted openings 5 will provide for a controlled dissolution in the aqueous medium of the agent in the tablets 6. Useful apparatus for employing such an arrangement of the Figure has been shown for example in U.S. Pat. No. 3,595,786. Of course, variations of such a tablet feeder can be useful. For example, even using a hollow cylindrical feeder, the lower plate 4 may be recessed into the tube 2 and may be perforate or imperforate. Likewise, the slotted opening 5 can extend through the bottom of the tube 2 and past an imperforate recessed plate 4. Other such devices for providing a controlled dissolution of the agent in tabletted form will be apparent to those skilled in the art.

The agent in the form of a tablet 6 will usually have the cylindrical shape as shown in the figure, with opposing flat surfaces, top and bottom. It is advantageous for tablet strength that the thickness for individual tablets 6 in such form be greater than 1.25 centimeters and it is preferred for best tablet strength that the thickness be on the order of 2.5 to 5 centimeters or more. Usually the tablet breadth, e.g., the diameter of the tablet for a cylindrically shaped tablet 6, will be within the range of from about 2 centimeters to about 10 centimeters. More typically a tablet of such shape will have a diameter of from about 4 to about 7.5 centimeters. In general, the tablets of greater thickness likewise have larger diameter, conforming to the shape as shown in the figure.

When a holder means is employed, the tablet should substantially fill the breadth of the holder means orifice. For example, with a cylindrical tablet holder or tube 2, the diameter of the tablet 6 should be at least about 66 percent, i.e., at least about ⅔, of the diameter of the orifice to enhance free movement of the tablet 6 therein without blockage, e.g., without turning and wedging of the tablet 6 in the orifice of the tube 2. Usually, the tablet diameter in such configuration will be on the order of 90–94 percent of the orifice diameter, as a maximum proportion. Most typically the tablet 6 will have a diameter of from about 80 to 90 percent of the orifice diameter. In a most advantageous form for controlled dissolution in liquid media the treating agent will contain greater than 50 weight percent of active salt in a cylindrical tablet of greater than 1.25 centimeters thickness and about 5–7 centimeters diameter, the tablet being sized to at least about ⅔ of the diameter for the orifice of a tablet holder.

Although the use of compacted treating agent has thus been most particularly shown in the drawing in a gravity feeding apparatus, it will be understood by those skilled in the art that such compacted agent will be similarly suitable for use as pressurized treatment systems.

The following examples show ways in which the invention has been practiced but should not be construed as limiting the invention.

EXAMPLE 1

For preparing a water treating agent there is first blended together 94 weight parts of sodium sulfite with 6 weight parts of calcium caseinate. The sodium sulfite is a free-flowing powder, dry to the touch, and has an average particle size of 125±25 microns with a particle size range of from about 45 microns to about 300 microns. On analysis this salt is shown to contain 96.5 weight percent sodium sulfite with a 3.5 weight percent balance of impurities, principally iron. the calcium caseinate binder is a free-flowing, finely divided white powder that is dry to the touch and contains 93 weight percent, minimum, of protein, 4.5 weight percent, maximum, of moisture, 1.3±0.2 weight percent calcium and has a fat content of 1.5 weight percent maximum. These materials are blended together in a ribbon blender and during mixing there is sprayed onto the mixture 3.5 weight percent, basis combined weight of the salt plus binder, of deionized water.

Discrete amounts of the resulting blended material are then subjected to pressure compaction at about 10 KPSI in a Stokes Single Station Press to prepare tablets having a density of about 1.8 grams per cubic centimeter and having a size of about 6.67 centimeters (cm.) in diameter and about 1.9 cm. thick. The compressed tablets are then merely permitted to air dry, and thereby harden, at room temperature.

Into a test cylinder as depicted in FIG. 1 there are placed three tablets totaling 454 grams of tableted material. The tablets in the cylinder are exposed by slotted openings of the cylinder at a perforate end. The water treatment apparatus employed is a Model 100 Sanuril ™ Wastewater Chlorinator such as has been depicted in U.S. Pat. No. 3,595,786. Tap water containing 4.55 parts per million chlorine is run through the cylinder at a rate of 501.32 milliliters of water per second for a total of 3 hours. Chlorine analysis, performed by the DPD Ferrous Titrimetric Method, is then made from the resulting treated water. No chlorine is detected. In continued testing, and maintaining a flow rate for the water at 501.32 milliliters per second, the dissolution rate for the tablets is found to be 48.63 grams per hour per tablet. Residual sulfite, as determined by the iodide/iodate test method, is found to be 11.0 ppm in the effluent from the treatment apparatus.

EXAMPLE 2

A water treating agent is prepared by first blending 85.13 weight parts of calcium caseinate, containing 3.61 weight percent moisture, with 340.5 weight parts added water. The calcium caseinate used is a dry, free-flowing powder. The water addition is 14.4 weight percent added water, basis all dry materials. The resultant mixture is then blended with sufficient sodium sulfite to provide 96.18 weight percent of the sulfite, basis dry materials. The blending takes place in a ribbon blender. The resulting moist material is then wet granulated through a 6 mesh screen. Granulated material is permitted to air dry, overnight, providing a granular material of about 5 weight percent of the added moisture.

The dried granules are further granulated through a 16 mesh screen. The resulting granules, now all finer than 16 mesh, are pressed at 10 kpsi in a Stokes Press to provide tablets having a density of about 2.0 grams per cubic centimeter and a size of about 5.71 centimeters diameter and about 2.22 centimeters thick. Resulting test tablets are then tested in the manner of Example 1 in the apparatus as described therein.

In the test, tap water containing 10.75 parts per million chlorine is run through the apparatus and by the tablet-containing cylinder at a rate of 223 milliliters of water per second for a total of 2 hours. Chlorine analysis, performed by the method of Example 1 is then conducted. No chlorine is detected. As the test continues, the dissolution rate for the tablets is found to be 34.85 grams per hour per tablet. Residual sulfite, measured in the manner of Example 1, is found to be 10.0 parts per million.

We claim:

1. A treating agent for extended time release, controlled dissolution in liquid media, said agent comprising, in blended and compacted form prepared from a moist mix, a solid mixture of greater than 50 weight percent of at least one salt from the sulfur oxide family together with a protein containing, organic gel forming binder.

2. The agent of claim 1, wherein said salt is capable of reacting with chlorine, bromine or iodine in aqueous media and said binder is capable of forming a gel with aqueous media.

3. The agent of claim 1, wherein said mixture is formulated from free-flowing particulate substances in blended form.

4. The agent of claim 1, wherein said mixture is further in mixture with from about 2 to about 20 weight parts added moisture, basis 100 weight parts of said mixture.

5. The agent of claim 1, wherein said mixture is further in mixture with from about 0.1 to about 5 weight percent of lubricant, basis total weight of said mixture.

6. The agent of claim 1, wherein said salt is sulfite salt.

7. The agent of claim 6, wherein said sulfite is an alkali metal sulfite or a mixture of alkali metal sulfites.

8. The agent of claim 1, wherein said organic gel forming binder contains animal protein.

9. The agent of claim 8, wherein said animal protein is casein.

10. The agent of claim 9, wherein said casein is an alkali metal or alkaline earth metal caseinate or mixture of such caseinates and contains greater than 50 weight percent protein.

11. The agent of claim 10, wherein said caseinate is calcium caseinate, sodium caseinate or mixture thereof.

12. The agent of claim 8, wherein said animal protein is gelatin.

13. The agent of claim 1, wherein said mixture is formed with from about 2 to about 20 weight percent binder, basis 100 weight percent of said mixture.

14. The agent of claim 1, wherein said salt is a free-flowing particulate substance having an average particle size within the range of from about 75 microns to about 250 microns.

15. The agent of claim 1, wherein said gel forming binder is a free-flowing particulate substance having an average particle size within the range of from about 75 microns to about 250 microns.

16. The agent of claim 1, wherein said mixture contains above about 80 weight parts of said salt, basis 100 weight parts of said mixture, dry basis.

17. The agent of claim 1, wherein said mixture is present as discrete, compacted particles.

18. The agent of claim 17, wherein said particles are tablets.

19. An agent in solid compacted condition and having extended time release, controlled dissolution in liquid media, said agent containing greater than 50 weight percent of sulfite, protein and less than about 10 weight parts added moisture, basis total weight of said agent.

20. The agent of claim 19, wherein said compacted agent contains sulfite, casein and less than about 8 weight parts added moisture, basis total weight of said agent.

21. The method of making a treating agent for extended time release, controlled dissolution in liquid media, which method comprises blending a salt from the sulfur oxide family together with a protein-containing organic gel forming blender and admixing added moisture therewith, said moisture being added in an amount up to about 20 weight parts of added moisture during preparation of said treating agent, basis 100 weight parts of said blend.

22. The method of claim 21, wherein said blending combines sulfite salt and protein binder.

23. The method of claim 21, wherein said blending combines free-flowing particulate substances of said salt and said binder with from about 2 to about 20 weight parts added moisture, basis 100 weight parts of said blend.

24. The method of claim 23, wherein said added moisture is admixed to said blend ingredients by spraying or misting water thereon.

25. The method of claim 23, wherein said added moisture is admixed with said binder and the resulting moistened binder is blended with said salt.

26. The method of claim 23, wherein said blend is subsequently dried.

27. The method of claim 21, wherein there is further admixed with said blend from about 0.1 to about 5 weight percent of lubricant, basis total weight of said blend.

28. The method of claim 27, wherein said blend is subsequently formed into discrete compressed particles.

29. The method of claim 28, wherein said blend is tableted.

30. The method of claim 27, wherein said lubricant is selected from the group consisting of fatty acid soaps, petroleum oil materials, animal fats and oils, vegetable oils and mixtures thereof.

31. A combination for dehalogenating liquid media, said dehalogenation being at a controlled dissolution rate for an extended time release, which combination comprises a holding m4 and of cylindrical shape adapted for receiving and holding dehalogenating agent, dehalogenating agent in solid tablet form contained within said holding means at a slotted opening zone of said holding means, said holding means having slotted openings permitting contact between fluid plus agent at such zone, said agent comprising, in blended and compacted form prepared from a moist mix, a mixture of greater than 50 weight percent of at least one salt from the sulfur oxide family together with a protein-containing organic gel forming binder.

32. The combination of claim 31, wherein said cylindrical shaped holding means has a series of slots around the cylinder at the slotted-opening zone with each slot extending longitudinally along the cylinder length.

33. The combination of claim 31, wherein said slots are positioned at one end of the cylindrical shaped holding means.

34. The combination of claim 31, wherein said salt is capable of reacting with chlorine, bromine or iodine in aqueous media and said binder is capable of forming a gel with aqueous media.

35. The combination of claim 31, wherein said salt is sulfite salt and said organic gel forming binder contains protein.

36. The method of dehalogenating a halogen-containing liquid medium with a dehalogenating agent of extended time release, controlled dissolution, which method comprises bringing said medium into contact with a solid agent prepared from a moist mix and comprising, in blended and compacted form, a mixture of greater than 50 weight percent of at least one salt from the sulfur oxide family together with an organic gel forming animal protein binder.

37. The method of claim 36, wherein there is brought together an aqueous medium with a mixture containing a salt capable of reacting with chlorine, bromine or iodine in said aqueous medium.

38. An anti-corrosive, oxygen scavenging agent for extended time release, controlled dissolution in liquid media, said agent comprising, in blended and solid compacted form prepared from a moist mix, a mixture of corrosion inhibitor compound plus at least one salt from the sulfur oxide family together with a protein-containing organic gel forming binder.

39. The agent of claim 38, wherein said corrosion inhibitor compound is a phosphate-containing substance.

40. A combination for oxygen scavenging liquid media at controlled dissolution rate and for an extended time release while imparting anti-corrosive property to said media, which combination comprises a holding means of cylindrical shape adapted for receiving and holding oxygen scavenging agent, oxygen scavenging agent in solid tablet form contained within said holding means at a slotted-opening zone thereof, said holding means having slotted openings permitting contact between liquid plus agent at said zone, said agent comprising, in blended and compacted tablet form, a mixture of corrosion inhibitor compound plus at least one salt from the sulfur oxide family together with a protein-containing organic gel forming binder.

41. The method of making an agent for extended time release, controlled dissolution in liquid media which method comprises blending together, as free-flowing particulates, a salt from the sulfur oxide family together with a protein-containing organic gel forming binder, moistening the resulting blend by admixing additional water therewith, said water being added in an amount up to 20 weight percent additional water, basis weight of said salt plus binder, granulating the resulting admixture to particles having size more finely-divided than about 5 mesh, drying the granulated particles to a moisture content of less than about 10 weight percent additional water, further granulating the dried particles to a size more finely-divided than about 10 mesh and compacting the granulated, finely-divided particles into discrete, aggregated large solid particulates for controlled dissolution in liquid media.

42. The method of claim 41, wherein said salt plus binder are admixed with from about 3 to about 15 weight percent additional water, basis weight of said salt plus binder.

43. The method of claim 41, wherein said admixture is granulated to particles having size more finely-divided than about 10 mesh and said particles are dried to remove at least about 50 weight percent of the added moisture therefrom.

44. the method of claim 41, wherein said dried particles are granulated to provide particles having a size more finely-divided than about 20 mesh.

45. The method of claim 41, wherein said sized, fine particles are compacted at a pressure within the range from about 5 KPSI to about 20 KPSI to prepare aggregated particulate in tablet form.

46. The method of making an agent for extended time release, controlled dissolution in liquid media, which method comprises blending together a salt from the sulfur oxide family together with a protein-containing organic gel forming binder, admixing additional water therewith, said water being added in an amount up to 10 weight percent additional water, basis weight of said salt plus binder, roller compacting the resulting admixture to provide roller compacted particles of said admixture, screening the roller compacted particles to a size more finely-divided than about 10 mesh and further compacting the screened particles into discrete, aggregated larger solid particulates for controlled dissolution in liquid media.

47. The method of claim 46, wherein said salt plus binder are admixed with from about 4 to about 8 weight percent additional water, basis weight of said salt plus binder.

48. The method of claim 46, wherein said roller compacted particles are screened to provide particles having size within the range from about 20 to about 40 mesh.

49. The method of claim 46, wherein said roller compacted, screened particles are further compacted at a pressure with the range from about 5 KPSI to about 20 KPSI to prepare aggregated particulates in tablet form.

50. An agent in solid, compacted and tabletted form and having extended time release, controlled dissolution in liquid media, said tabletted form being cylindrical in shape with a diameter of up to about 10 centimeters, while having opposed, flat surfaces with a tablet thickness therebetween of greater than about 1.25 centimeters, with the agent containing sulfite in amount greater than about 50 weight percent, basis total weight of said tablet.

51. The tabletted agent of claim 50, wherein said cylindrical tablet has a diameter of up to about 7.5 centimeters, a thickness not in excess of about 5 centimeters and a diameter of at least ⅜ of the diameter for the orifice of a holding means for said tablet.

52. The tabletted agent of claim 50, wherein said tablet further contains protein-containing organic gel-forming binder and less than about 10 weight parts water, basis total weight of said tablet.

53. The tabletted agent of claim 50, wherein said tablet further contains from about 0.1 to about 5 weight percent, basis total weight, of lubricant.

54. The tabletted agent of claim 53, wherein said tablet contains from about 2 to about 20 weight percent binder and has a density within the range of from about 1.5 to about 2.5 grams per cubic centimeter.

* * * * *

REEXAMINATION CERTIFICATE (3011th)

United States Patent [19]
Nelson et al.

[11] B1 4,816,177
[45] Certificate Issued Oct. 1, 1996

[54] TREATING AGENT FOR LIQUID MEDIA

[75] Inventors: Bonnie I. Nelson, Mentor; Randolph C. Turk, Euclid, both of Ohio; Lemuel C. Curlin, Allegan, Mich.

[73] Assignee: Eltech Systems Corp., Chardon, Ohio

Reexamination Request:
No. 90/003,172, Aug. 25, 1993

Reexamination Certificate for:
Patent No.: 4,816,177
Issued: Mar. 28, 1989
Appl. No.: 61,931
Filed: Jun. 11, 1987

Related U.S. Application Data

[63] Continuation of Ser. No. 763,041, Aug. 6, 1985, abandoned.

[51] Int. Cl.$^6$ ........................................ C02F 1/68
[52] U.S. Cl. ................ 252/181; 106/124; 106/125; 106/137; 106/138; 106/148; 210/749; 210/750; 210/753; 252/175; 252/188.2; 252/188.21; 252/388; 252/389.1; 252/389.2; 530/360; 530/365; 424/465; 424/469; 424/470
[58] Field of Search ............................ 252/181, 180; 423/512 R

[56] References Cited

U.S. PATENT DOCUMENTS

2,936,289  5/1960  Harshman et al. ............... 252/181
3,647,523  3/1972  Horvath et al. ................. 117/100 B
3,856,932  12/1974  May ................................. 424/16

FOREIGN PATENT DOCUMENTS

848626  7/1952  Germany.
1938735  2/1970  Germany.

OTHER PUBLICATIONS

Eltech Systems Corp., Sanuril Brochure, 1982, all pages. (Month unknown).
Eltech Systems Corp., Sanuril Brochure, 1983, all pages. (Month unknown).
Cook and Martin, *Remington's Practice of Pharmacy*, 1948, (First Ed. 1889), pp. 1286–1293. (Month unknown).
F. J. Stokes Corporation, *Stokes Industrial Compaction Presses*, Oct. 1958.
Vector Corporation, *Tablet Making Bulletin No. 50TB*, Aug. 31, 1976, all pages.
Eltech Systems Corp., Aquaward Brochure, 1984, all pages. (Month unknown).

*Primary Examiner*—Prince Willis, Jr.

[57] ABSTRACT

An agent is disclosed that is useful for treating liquid media, e.g., dechlorinating aqueous media. The agent contains at least one salt from the sulfur oxide family, such as sodium sulfite. In the agent, the salt is in mixture with an organic gel forming binder. The mixed material is especially adapted for preparing self-supporting, discrete particles of solid compacted material, e.g., tableted composition. The composition can provide such compacted material not only of desirable strength and hardness, but also of desirably controlled dissolution rate.

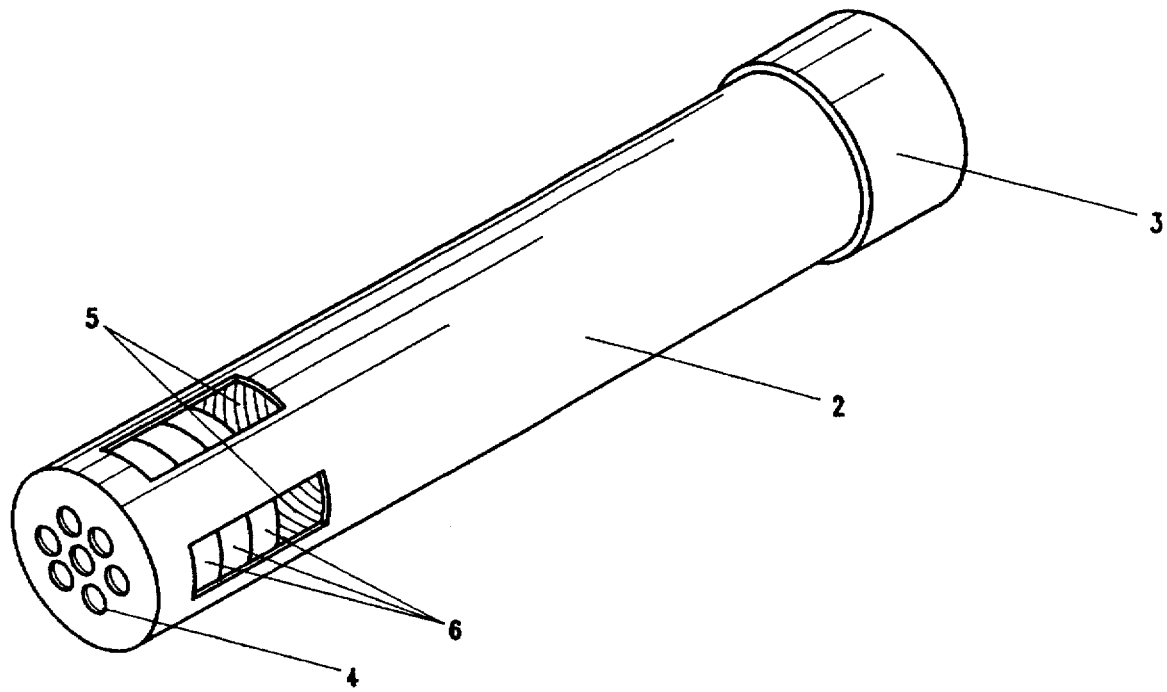

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–49 is confirmed.

Claim 50 is determined to be patentable as amended.

Claims 51–54, dependent on an amended claim, are determined to be patentable.

50. [An] *A dechlorinating* agent in solid, compacted and tabletted form and having extended time release, controlled dissolution in liquid media, said tabletted form being cylindrical in shape with a diameter of up to about 10 centimeters, while having opposed, flat surfaces with a tablet thickness therebetween of greater than about 1.25 centimeters, with the agent containing sulfite in amount greater than about 50 weight percent, basis total weight of said tablet.

* * * * *